United States Patent [19]

Dalton, Jr. et al.

[11] 4,025,605

[45] May 24, 1977

[54] METHOD FOR REMOVING LOW CONCENTRATIONS OF OXIDIZABLE ORGANIC CONTAMINANTS FROM AN OXYGEN-CONTAINING INERT GAS

[75] Inventors: Augustine I. Dalton, Jr.; Shivaji Sircar, both of Allentown, Pa.

[73] Assignee: Air Products and Chemicals, Inc., Allentown, Pa.

[22] Filed: May 7, 1975

[21] Appl. No.: 575,345

[52] U.S. Cl. .............................. 423/240; 423/210; 423/245
[51] Int. Cl.² ........................................ B01D 53/34
[58] Field of Search ....... 423/210, 245, 212, 215.5, 423/240, 213.2, 241, 213.5; 55/74; 252/411 R, 416, 447

[56] References Cited
UNITED STATES PATENTS

| | | | |
|---|---|---|---|
| 3,067,002 | 12/1962 | Reid, Jr. | 423/213.5 |
| 3,150,922 | 9/1964 | Ashley | 423/213.2 |
| 3,455,089 | 7/1969 | Mattia | 423/210 X |
| 3,658,724 | 4/1972 | Stiles | 252/447 X |

FOREIGN PATENTS OR APPLICATIONS

| | | | |
|---|---|---|---|
| 902,136 | 7/1962 | United Kingdom | 423/245 |

*Primary Examiner*—Earl C. Thomas
*Attorney, Agent, or Firm*—Richard A. Dannells; Barry Moyerman

[57] ABSTRACT

A method for removing low concentrations of oxidizable organic contaminants from an oxygen containing inert gas comprises: (1) adsorbing the contaminants on a sorptive media which contains an oxidation catalyst in a reaction zone; (2) interrupting the flow of the gas through said sorptive media; (3) thermally desorbing the adsorbed contaminants; (4) oxidizing the desorbed contaminants to innocuous reaction products; and (5) venting and purging the reaction products from the reaction zone.

13 Claims, 2 Drawing Figures

METHOD FOR REMOVING LOW CONCENTRATIONS OF OXIDIZABLE ORGANIC CONTAMINANTS FROM AN OXYGEN-CONTAINING INERT GAS

BACKGROUND OF THE INVENTION

1. Field of the Invention

This invention relates to a novel method for removing undesirable organic substances present in low concentrations from a gas stream by adsorbing the contaminants onto a sorptive media and subsequently destroying the contaminants by catalytic oxidation and/or hydrolysis, referred to herein simply as oxidation.

More particularly, this invention provides a practical route for eliminating even trace amounts of contaminants from an oxygen containing inert gas stream by passing the stream through an adsorptive bed which is in intimate contact with an oxidation catalyst, followed by thermal desorption of the contaminant and its subsequent conversion to innocuous products. Specifically, it may be used to effectively remove vinyl chloride monomer, chloroprene and vinylidene chloride from contaminated air streams.

The removal of vinyl chloride from the atmosphere has particular relevance at this time because it is believed hazardous to health and is associated with tumor-inducing activity. As a result, considerable effort has been directed to eliminating or at least reducing the concentration of vinyl chloride in work areas and its environs.

2. Description of the Prior Art

There are several known methods for removing or reducing the concentration of dilute contaminants in the atmosphere. In general, these methods fall into two broad categories: (1) contacting the contaminated gas with a liquid solvent which selectively absorbs the contaminant, or (2) adsorbing the contaminant onto a solid adsorbent.

The first of the aforementioned processes, namely, the absorption of a contaminant via the use of a solvent, is illustrated by Bellisio in U.S. Pat. No. 3,807,138. The principle disadvantage in the Bellisio method is its inability to effectively remove trace quantities of vinyl chloride monomer. Furthermore, the process requires that the feed gas be compressed to an elevated pressure for efficient dissolution of vinyl chloride monomer making it economically unattractive when large volumes of feed has to be handled. Other disadvantages are high cost of solvent and loss of solvent during the stripping step.

The second principal method heretofore employed for the removal of contaminants in a gas is illustrated by Raduly, U.S. Pat. No. 3,796,023. That patent describes a method for removing vinyl chloride monomer by passing inert gases containing the contaminant over a single layer of activated carbon maintained at a temperature of $-10°$ to $35°C$ followed by the desorption of the vinyl chloride by heating the layer with steam and the separation of the desorbed vinyl chloride monomer from the steam by condensation of the water vapor. The main disadvantage to this procedure is that upon contacting the carbon bed with live steam the adsorptive capacity of the activated carbon for vinyl chloride monomer is either destroyed or substantially lessened. Therefore, regeneration of the activated carbon requires the removal of adsorbed and void water and such regeneration necessitates an additional stream of inert, hot gas. Furthermore, when the monomer content of the feed stream is very low the cost of recovery by this method is uneconomical.

A variation on the solid-adsorption process is illustrated by the two-stage method of French Pat. No. 2,194,469. The first stage acts as an adsorber which removes the contaminants from the gas stream. The adsorbed molecules are then desorbed by (1) passing a cleaning gas through the first stage or, (2) by applying a vacuum to the first stage and passing the desorbed contaminants through a second stage consisting of a packed column containing an oxidation catalyst. In this second stage, the contaminants are oxidized with the application of heat to non-toxic products.

The two-stage method of French Pat. No. 2,194,469 appears to be an improvement over known adsorption processes, but it has several disadvantages. First, it is essential that the contaminants adsorbed in the first stage be removed as completely as possible from the adsorptive support. This is effected by either of two methods: (1) by passing a clean stream of gas through the first stage so as to elute the adsorbed contaminants, or (2) by evacuating the first stage following the adsorption cycle. Either method is impractical: (1) elution requires large quantities of a cleaning gas for complete desorption of the adsorbed impurities and (2) evacuation procedures require a low pressure level in order to clean the column efficiently. The feasibility of evacuation depends upon the affinity of adsorption; the stronger the affinity of the adsorbent material for the contaminant, the lower the efficient desorption pressure; hence, this approach necessitates substantial energy expenditures.

In addition, the two-stage French process requires that the contaminants obtained from the first stage be passed through the second stage support together with a large quantity of the cleaning gas if desorption from the first stage is carried out by elution. As a practical matter this means that a large volume of gas has to be heated to the reaction temperature in order to achieve the desired oxidation in the second stage. Such a procedure obviously requires a large expenditure of energy and, therefore, it is neither practical nor efficient. Also, it should be noted that if the desorption of the concentrated adsorbed contaminants from the first stage layer is carried out by elution, then the concentration of the contaminant is rediluted and the advantage of concentrating the impurities in the first stage is lost.

Another method for purifying air is set forth in an article entitled "Catalytic Reaction of Activated Carbon in Air Purification Systems" by Amos Turk, Industrial and Engineering Chem., Vol. 47, pages 966 to 971 (1955). The method, which employs a catalyst of a Group VI-A metal oxide such as chromic oxide deposited on activated carbon, comprises saturating the carbon with an organic contaminant in a stream of circulating air, heating an air stream of reduced quantity to oxidation temperatures, e.g., $220°$ to $350°C$, and recirculating the heated air to oxidize the contaminants and to reactivate the carbon adsorbent. The Turk reference teaches that catalyst agents such as platinum and palladium deposited on carbon are not applicable to this method because they would render the carbon pyrophoric at temperatures used to reactive the catalyst. This method suffers from some of the same disadvantages noted above in connection with French process.

The process of this invention overcomes the disadvantages of prior art methods by providing both an efficient means of removal and destruction of oxidizable dilute organic contaminants from air and other inert gas streams containing molecular oxygen.

SUMMARY OF THE INVENTION

The present invention provides a method for removing concentrations of up to 5% by weight of oxidizable contaminants from an oxygen-containing inert gas. The gas may be air or any industrial oxygen-containing inert gas comprising oxidizable organic contaminants. In practice, this method is effected by passing the contaminated gas through a single packed bed or layer of an adsorbent admixed or impregnated with a suitable oxidation catalyst. After completion of adsorption of the contaminants the flow of gas is interrupted. The contaminants are then oxidized batchwise at the reaction temperature and ultimately the reaction products are vented and purged from the system.

Specifically, the method of this invention comprises:

a. adsorbing, in a reaction zone having an inlet and outlet, the oxidizable contaminants onto a sorptive media which is in intimate contact with an oxidation catalyst selected from the group consisting of platinum metal, palladium metal and the salts thereof or mixtures of same by passing the gas through the inlet and the sorptive media;

b. removing the resulting decontaminated gas from the outlet;

c. interrupting the passage of the oxygen-containing inert gas through the sorptive media by closing the inlet and outlet;

d. desorbing the contaminants by the application of indirect heat to the sorptive layer;

e. oxidizing the desorbed contaminants to innocuous reaction products;

f. venting and purging the innocuous reaction products from the reaction zone; and g. cooling the reaction zone to ambient conditions.

The sorptive media may be any activated adsorbent such as carbon, charcoal or mixtures thereof. The oxidation catalyst may be impregnated or otherwise deposited onto the sorptive media. Alternatively, the catalyst may be deposited on any of the well-known catalyst supports, e.g., alumina, silica-alumina, zeolites (crystalline zeolitic aluminosilicates) and the like and the resulting supported oxidation catalyst is then admixed with the sorptive media by solids blending techniques.

By this invention it is possible to remove even trace amounts, i.e., 1 ppm, of oxidizable organic contaminants from air or other inert gas streams containing oxygen. It is however to be understood, the upper concentration limit of the contaminant safely operable in this process will be determined by the sorptive properties of the particular contaminant-sorbent combination. That is, during desorption of the contaminant at elevated temperature, the concentration of the air-contaminant mixture in the reaction zone should not be allowed to exceed its lower explosion/flammability limits. An application of current interest is residual vinyl chloride in exhaust streams from polyvinyl chloride synthesis plants. The object in this case is not the recovery of vinyl chloride monomer because of its low concentration but rather its effective removal from the atmosphere.

This process consists of passing the contaminated gas through a single layer or bed of an adsorbent in intimate contact with the oxidation catalyst. The contaminated gas is passed through the sorptive media at ambient conditions so as to adsorb the contaminant. Adsorption is continued until breakthrough of the contaminants as defined by the appearance of a predetermined acceptable level of concentration of the contaminant at the outlet or exit end of the adsorption-reaction zone.

Upon breakthrough of the contaminant, the flow of the contaminated stream through the adsorption-reaction zone is stopped and the adsorption step is thus brought to an end. The inlet and outlet parts of the adsorption-reaction vessel are then closed. The column is then heated by the indirect application of heat as, for example, by passing a stream of hot gas, or hot water or steam and the like through the heating lines. In this manner the temperature of the packed bed in the column is raised to the level needed to oxidize the contaminants. This procedure insures that the contaminants or subsequent reaction products are confined in the adsorption-reaction vessel which constitutes a salient feature of this invention.

The confined contaminants, desorbed or otherwise, at the reaction temperature, are then catalytically destroyed in the presence of atmospheric oxygen. The oxidation reaction is allowed to continue until essentially all of the confined contaminants in the adsorption-reaction vessel are converted to innocuous materials. The column is then opened while at the elevated temperature to the atmosphere to vent any incipient pressure build-up. In addition to decreasing the pressure, the venting of the column to the atmosphere also serves to remove some of the innocuous reaction products. This venting step is followed by the passing of a stream of inert gas such as air through the hot bed in order to sweep out the remaining reaction products from the adsorption-reaction vessel. The column is then cooled to ambient temperature indirectly by passing a cooling fluid such as air or water through the cooling lines. An alternative method consists in simply cutting off the column from the system so that it may cool extraneously.

The desorption and destruction of the adsorbed contaminants by batchwise indirectly heating the column is particularly advantageous because it requires substantially less energy than known processes. This is the case because the adsorbent and adsorbed contaminants only (including void gas in the column) has to be heated to the reaction temperature. By contrast, the two-stage French process described above in the Prior Art Section requires a large energy input because it is not only necessary to heat the second stage adsorbent and the desorbed contaminants of the first stage but, also, the large quantity of cleaning gas which is used to sweep the contaminants from the first stage.

This invention is an improvement over known methods for still another reason. In this process the heating of the packed bed to reaction temperatures batchwise results in a confinement of the reaction products to the void spaces in the column, that is, they are concentrated in a confined space and, as a result, can be subjected to oxidation much more efficiently than would be otherwise possible. This is a significant improvement over the method described in the French Patent. That process provides for removing the adsorbed contaminants via elution and in so doing the concentration of the contaminants is rediluted. Therefore, the advantage in concentrating the impurities in the first stage is lost.

Still another advantage of batchwise operation of this invention is that intermediate organic products, which themselves may be harmful, are also more efficiently destroyed.

We have found, that in the instant process only platinum and palladium catalysts and their salts effect the rate of the oxidation reaction which is necessary for substantially complete and rapid destruction of contaminants from a contaminated inert gas at relatively low temperatures. Despite high oxidation activity for the contaminants, these catalysts are advantageously found to be relatively inactive towards the oxidation of the adsorbent carbon at the relatively low temperatures utilized in this process. This ability to carry out the destruction of the contaminants at relatively low temperatures and without significant combustion of the carbon is one of the major advantages of this invention from the operational and economic standpoint. The catalyst may be present on the support in weights of from about 0.05 to 7% by weight of the metal. An especially preferred embodiment consists of activated carbon catalysts in which the platinum or palladium metal or its salts is present in amounts equal to or less than 3% by weight. The reaction temperature may be as low as 90°C and its upper limit is prescribed by the ignition temperature of the particular carbonaceous adsorbent used in the process. Since the adsorbents have an ignition temperature of about 300°–400°C, the operable temperatures for this invention are in the range of from about 90°C to about 200°C. In general, the higher the reaction temperature, the more rapid is the rate of oxidation of the contaminants. However, from a practical and economic standpoint, it is preferred to operate within the range of from about 120° to 180°C.

The 120°–180°C temperature range is substantially less than is required for known processes and, as a result, the instant process not only provides a feasible means for removing even trace amounts of oxidizable organic contaminants, e.g., vinyl chloride, from oxygen-containing inert gases, but does so with a substantial saving in energy and, therefore, with greater economy than was heretofore possible.

A BRIEF DESCRIPTION OF THE DRAWING

FIG. 1 is a flow diagram illustrating the operation of one pair of adsorption-reaction vessels (1A and 1B). At least one pair of these vessels is needed for continuous operation. In that case, one vessel is in the adsorption cycle while the other is in the desorption, regeneration and cooling cycle. The total number of vessels required for a given plant operation is determined by the capacity of the plant, allowable pressure drop, reaction time and the like.

FIG. 2 is a schematic of the adsorption reaction vessel employed in the method illustrated in FIG. 1.

DESCRIPTION OF THE PREFERRED EMBODIMENT OF THIS INVENTION

Figure 1:
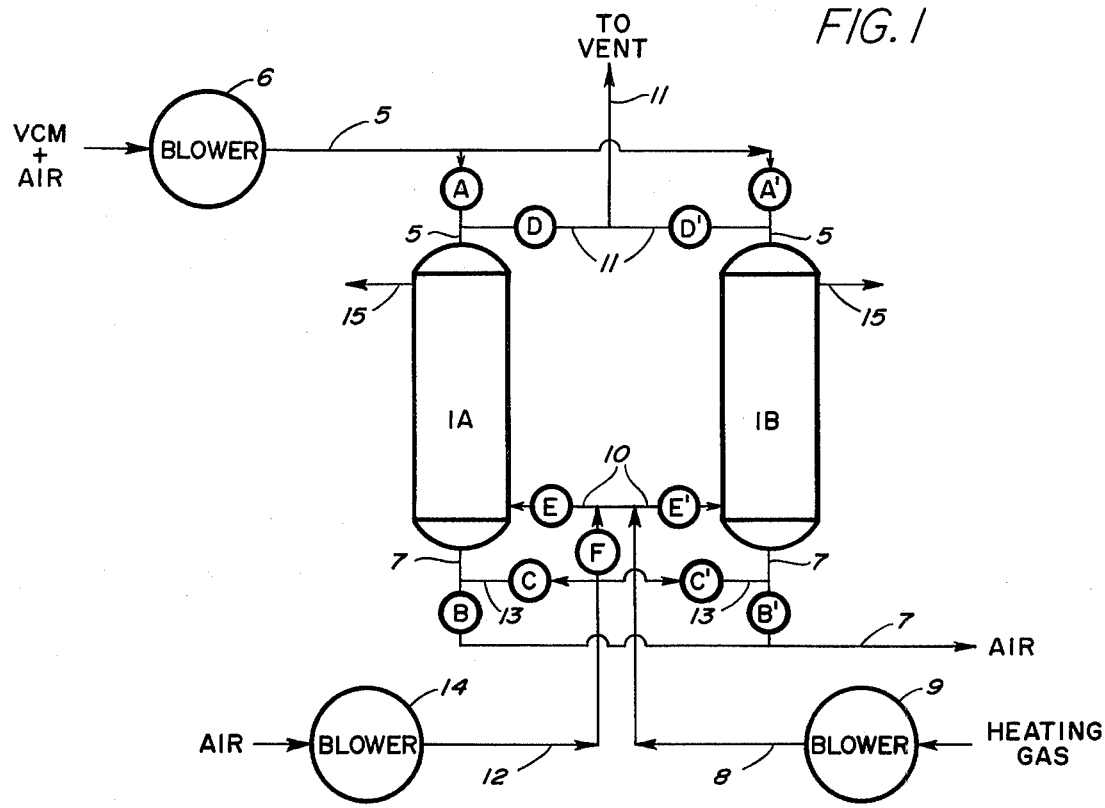
Figure 2:
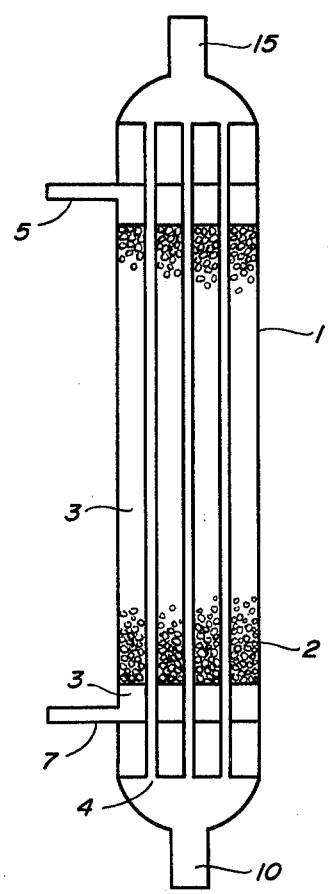

Referred now to FIGS. 1 and 2, there is illustrated the removal of vinyl chloride monomer as a contaminant from air which may also be saturated with water vapor at ambient conditions. However, it is to be understood that this is for illustrative purposes only and that the instant process is in fact applicable for removing low concentrations of oxidizable organic contaminants from an oxygen-containing gas. Reaction vessel 1 consists of a shell and tube-type vessel which is packed with adsorbent in intimate contact with the catalyst to form catalyst bed 2 in shell side 3. Tube side 4 of vessel 1 is used for indirect heating or cooling of the adsorbent. However, the invention is not limited to the particular configuration described in FIG. 2. That is, the adsorbent with the catalyst may be packed in the tube side while the shell side is used for passage of heating or cooling medium.

Vessels 1A and 1B of FIG. 1 are in parallel and are provided with means for cooling and heating. By virtue of this system, vinyl chloride monomer (VCM) is adsorbed, heated and converted to the reaction products which are then vented and purged from the system. The system is equipped with valves A, A', B, B', C, C', D, D', E, E' and F.

The adsorption-reaction vessels of this system work alternatively, one of them being in the adsorption cycle while the other is in the cycle of desorption and destruction of the confined VCM.

A sorptive support such as activated carbon in intimate contact with the appropriate catalyst is placed in shell side 3 of vessels 1A and 1B. The VCM in air is then introduced into the shell side of vessel 1A through valve A and inlet 5 by means of blower 6.

During the adsorption cycle, the VCM is adsorbed at ambient temperature from the contaminated stream onto the activated carbon adsorbent and the resulting decontaminated air passes to the atmosphere via valve B and outlet 7. Adsorption is continued until breakthrough of the VCM occurs as indicated by the appearance of VCM at a predetermined concentration level in the air in outlet 7.

Upon breakthrough of the VCM, the adsorption cycle is completed and the desorption, oxidation reaction and cooling cycle begins. The flow of the contaminated air through inlet 5, vessel 1A and outlet 7 is stopped by closing valves A and B. The temperature within the vessel is raised by opening valve E and passing heating fluid (steam, hot gases, hot water and the like) through line 8 by blower 9 into tube side 4 via line 10 and valve E. Bed 2 in vessel 1A is heated to the necessary reaction temperature. The desorbed VCM is catalytically destroyed during this portion of the cycle due to the oxygen in the air which is present in the voids in the shell side of vessel 1A, to form the final reaction products, predominantly of HCl, $CO_2$ and $H_2O$. The reaction products remain confined in the voids in the shell side of vessel 1A. The cycle is continued until the VCM level in the reaction zone is reduced to the desired level.

After the desired level is reached, vessel 1A is vented to the atmosphere by opening valve D to release any pressure build-up which has resulted from the desorption and the oxidation reaction and thereby remove some of the reaction products through line 5, valve D and line 11. Valve C is then opened and a stream of ambient air is passed through the shell side of the hot bed through lines 12, 13, 7, 5 and 11 by blower 14. This purging step is designed to sweep out the remaining reaction products from the void spaces. Vessel 1A is cooled to ambient temperature indirectly by passing a cooling fluid through the tube side of vessel 1A via line 12, valves F and E and lines 10 and 15. Valves A, B, C and D are kept closed during the cooling step.

The cyclic operations of vessels 1A and 1B in FIG. 1 are further illustrated in Table I. The table describes the operation of each vessel and shows the valve positions during one complete cycle.

TABLE I

| Operation | | Valve Positions* | | | | | |
|---|---|---|---|---|---|---|---|
| Vessel 1A | Vessel 1B | A A' | B B' | C C' | D D' | E E' | F |
| Adsorption | Heating | O C | O C | C C | C C | C O | C |
| Adsorption | Purging | O C | O C | C O | C O | C O | C |
| Adsorption | Cooling | O C | O C | C C | C C | C O | O |
| Heating | Adsorption | C O | C O | C C | C C | O C | C |
| Purging | Adsorption | C O | C O | O C | O C | O C | C |
| Cooling | Adsorption | C O | C O | C C | C C | O C | O |

*C—Closed
O—Open

The following examples are designed to illustrate various aspects of the method of this invention. However, it is to be understood that the examples are for illustrative purposes only and are not intended to limit this invention.

EXAMPLE 1

To confirm the feasibility of the instant process, this example was conducted to measure the kinetics and capacity for adsorption and the kinetics of the reaction for the disappearance of VCM using 1.6 weight % palladium chloride on RB-grade of activated carbon (12 × 30 mesh) in conjunction with VCM-contaminated air stream:

1. Adsorption Capacity: The capacity for adsorption of VCM from air was measured at three different temperatures. The data is shown in Table II. The phenomenon was found to be thermally reversible with near complete desorption of the monomer at 100°–120°C. No polymerization of VCM was observed during these experiments. Presence of the catalyst in the concentration range studied does not appreciably alter the adsorptive properties of the base carbon adsorbent.

TABLE II

CAPACITY OF 1.6% PdCl$_2$ ON CARBON

| TEMPERATURE, °C | EQUILIBRIUM VCM CONCENTRATION, PPM | EQUILIBRIUM CAPACITY, m moles/gm |
|---|---|---|
| 0° | 40.77 | 0.115 |
| 0° | 56.72 | 0.140 |
| 0° | 63.52 | 0.149 |
| 0° | 84.50 | 0.178 |
| 0° | 134.70 | 0.230 |
| 28° | 51.4 | 0.0674 |
| 28° | 51.7 | 0.0694 |
| 28° | 76.8 | 0.0907 |
| 28° | 96.9 | 0.103 |
| 28° | 103.4 | 0.106 |
| 28° | 109.3 | 0.1179 |
| 28° | 109.4 | 0.1042 |
| 28° | 158.8 | 0.1398 |
| 28° | 217.6 | 0.1691 |
| 64° | 23.9 | 0.0161 |
| 64° | 56.1 | 0.0321 |
| 64° | 158.07 | 0.0688 |
| 64° | 174.32 | 0.0740 |

2. Adsorption Kinetics: Vinyl chloride breakthrough was measured by flowing a 260 ppm monomer-air stream through a column of the catalytic material and continuously monitoring the exit gas composition. This test indicates that (a) the VCM can be completely removed by adsorption, (b) the shape and size of the mass transfer zone (MTZ) is practically independent of the gas flow rate in the range studied and, (c) the length of the MTZ is only 1 to 3 inches long.

Table III shows the data obtained in this test.

TABLE III

VCM BREAKTHROUGH FOR PdCl$_2$ ON CARBON

| Feed Flow Rate, l./min. | 0.6 | | 1.286 | |
|---|---|---|---|---|
| Contaminant concentration, ppm | 260 | | 260 | |
| Temperature, °C. | 24 | | 24 | |
| Weight of Catalyst, gms. | 1.6304 | | 1.6304 | |
| Length of Bed, cm. | 5.82 | | 5.82 | |
| Diameter of Bed, cm. | 0.996 | | 0.996 | |
| Cross Section of Bed, cm.$^2$ | 0.778 | | 0.778 | |
| Volume of Bed, cc. | 4.53 | | 4.53 | |
| Linear Velocity (based on empty vessel), ft./sec. | 0.422 | | 0.904 | |
| RESULTS: | Time, min. | Exit Contaminant Concentration, ppm | Time, min. | Exit Contaminant Concentration, ppm |
| | 0 | 0 | 0 | 0 |
| | 1 | 0 | .1 | 0 |
| | 4 | 0 | 7 | 1.1 |
| | 7 | 0 | 10.33 | 4.6 |
| | 10 | 0.3 | 20.33 | 52.6 |
| | 20.50 | 1.4 | 30.83 | 179.2 |
| | 27.17 | 7.4 | 37.00 | 229.8 |
| | 30.33 | 12.8 | 44.58 | 253.2 |
| | 40.33 | 44.1 | | |
| | 50.00 | 97.6 | | |
| | 55.00 | 139.3 | | |
| | 60.00 | 180.0 | | |
| | 73.67 | 252.3 | | |

3. Reaction Kinetics: A bed of the same catalytic material was saturated with an air stream containing 1154 ppm of VCM at 26° C. The reaction zone was then heated to 152° C batchwise and the concentration of the monomer in the gas phase was measured as a function of time. The concentration of VCM in the system is reported in Table IV. From Table IV it is apparent that if the reaction had been allowed to proceed it would have continued until the system was virtually free of the monomer.

TABLE IV

DISAPPEARANCE OF VCM

| Time, Minutes | VCM Concentration, ppm |
|---|---|
| 0 | 5375 |
| 54 | 4700 |
| 102 | 2400 |
| 204 | 200 |
| 324 | 25 |

EXAMPLE 2

Air contaminated with 260 ppm of VCM was passed through a bed containing 0.98 grams of 5% platinum by weight on activated carbon at 25° C to adsorb the VCM contaminant. The bed was brought to near-saturation with 260 ppm of VCM in air. The concentration of VCM in the gas phase was monitored by a gas chromatograph equipped with a flame ionization detector. When the adsorption step was completed, i.e., upon breakthrough of the VCM contaminant, the flow of the contaminated stream through the column was stopped and the reaction zone was isolated by closing the inlet and exit valves. The catalyst bed was then brought to 153° C by indirect heating with concomitant desorption and reaction of the monomer occuring. The desorption and the reaction products were confined to the voids of the column. The reaction was allowed to continue in the presence of oxygen and water vapor. After 10 minutes, the VCM concentration was reduced from 664 ppm to less than 25 ppm. After an additional 10 minutes, the VCM concentration was less than 5 ppm.

Upon completion of the reaction, the adsorption-reaction vessel was opened to the atmosphere to release the pressure build-up and remove some of the reaction products. A stream of ambient air was then passed through the hot bed in order to sweep out the reaction products from the void space. The column was then indirectly cooled batchwise to ambient temperature.

EXAMPLE 3

The procedure described in Example 2 was repeated using a reaction zone bed containing 1.1 gm of 1.6% by weight $PdCl_2$ on RB-grade of activated carbon and saturating the bed with 1154 ppm VCM in air at 25° C. The bed was heated to 153° C as before. After 3.4 hours, the VCM concentration was reduced from 5375 ppm to 200 ppm. After an additional two hours, the VCM concentration was 25 ppm at which point the reaction was arbitrarily terminated.

EXAMPLE 4

The prodedure described in Example 2 was repeated using a reaction zone bed containing 0.92 gm of 5% by weight of palladium on activated carbon and saturating with 1154 ppm VCM in air at 25° C. The bed was then heated to 157° C as before. After slightly more than two hours, the concentration of VCM in the reaction zone was reduced from 3800 ppm to less than 600 ppm of VCM. After an additional 50 minutes, the concentration of VCM was about 100 ppm. An additional 40 minutes of reaction rendered the VCM concentration to less than 5 ppm.

EXAMPLE 5

This example is designed to simulate the oxidation step of this method of this invention in order to evaluate the effectiveness of a palladium on alumina oxidation catalyst. In the practice of this method, this catalyst would be in intimate contact with a sorptive media.

A circulating closed-loop batch reactor system was used in this example containing a packed bed of 1.0 g of 0.5% by weight of palladium deposited on alumina. The closed system was evacuated to less than 1 Torr. (1 mm. Hg) pressure and then the packed bed was heated indirectly to 150° C. The total volume of the entire closed system was 645 cc. The system was brought to atmospheric pressure with 260 ppm VCM in air and the gas mixture circulated in the loop over the reaction zone at 150° C. The gas phase concentration of the VCM stream was periodically measured using a vapor phase chromatograph equipped with a flame ionization detector. After circulating the contaminated air for one hour, the concentration of VCM in the system was less than 90 ppm. After another 20 minutes, the concentration was reduced to less than 70 ppm VCM. This Example indicates the effectiveness of a platinum group metal deposited on alumina as an oxidation catalyst for use in the method of this invention.

EXAMPLES 6–12

The procedure described under Example 5 was followed in all of these examples which are designed to show the results of the destruction of contaminants during the oxidation step of the method of this invention employing various oxidation catalysts, catalyst concentrations, contaminants, contaminant concentrations, reaction temperatures, and cycle times. The length of a given cycle was determined by measuring the elapsed time between the initial contact of the catalyst with contaminated air stream and the end of the circulation of the contaminated stream which was analyzed for concentration of contaminants. In all of these examples, the procedure of Example 5 was repeated for at least three cycles except Example 12.

Table V summarizes the operating conditions and the results of Examples 6–12:

TABLE V

| EXAMPLE | 6 | 7 | 8 | 9 | 10 | 11 | 12 |
|---|---|---|---|---|---|---|---|
| OPERATING CONDITIONS | | | | | | | |
| Catalyst | | | | | | | |
| Type | Pt | Pt | Pd | $PdCl_2$ | $PdCl_2$ | Pd | $PdCl_2$ |
| Wt. % | 5.0 | 5.0 | 5.0 | 1.6 | 1.6 | 5.0 | 1.6 |
| Concentration, gms. | 0.1 | 0.1 | 0.1 | 0.5 | 1.73 | 0.1 | 0.5 |
| Contaminant | | | | | | | |
| Type | VCM | VCM | VCM | VCM | VCM | Ethylene | Acetaldehyde |
| Initial Concentration, ppm | 1130 | 264 | 264 | 264 | 1130 | 260 | 1850 |
| Temperature, ° C | | | | | | | |
| Cycle | 125 | 110 | 125 | 150 | 157 | 150 | 175 |
| Number | 3 | 6 | 3 | 6 | 6 | 3 | 1 |
| Length, min. | 45 | 30 | 30 | 45 | 60 | 45 | 10 |
| RESULTS | | | | | | | |
| Concentration after 1st Cycle, ppm | 2 | <1 | 110 | 52 | 16 | 10 | 108 |
| Concentration after 2nd Cycle, ppm | 20 | <1 | 150 | 43 | 7 | 16 | — |
| Concentration after 3rd Cycle, ppm | 610 | — | 168 | — | — | 20 | — |
| Concentration after 6th Cycle, ppm | — | <20 | — | 64 | 90 | — | — |

Although the catalysts described above are found suitable for the destruction of vinyl chloride, it is apparent to those skilled in the art that the choice of the catalyst in other cases will be dictated by the nature of the contaminant. Furthermore, the reaction mechanism need not be limited by catalytic oxidation alone. For example, in the case of palladium chloride catalyzed reactions of vinyl chloride monomer, hydrolysis may occur in addition to oxidation.

The presence of water vapor in the contaminated gaseous feed in the present process is not detrimental to the reactivity of the described catalysts. However, in the case of palladium chloride catalysts, water vapor should be present in the reaction zone during the reaction. This water vapor may come from the gaseous feed or may be added at some point prior to or during the reaction step in the cycle.

We claim:

1. A method for removing low concentrations of oxidizable organic contaminants from an oxygen-containing inert gas which comprises:
    a. adsorbing in a reaction zone having an inlet and outlet said oxidizable contaminants onto a sorptive media which is in intimate contact with an oxidation catalyst selected from the group consisting of platinum metal, palladium metal and the salts thereof or mixtures of same by passing said gas through said inlet and said sorptive media;
    b. removing the resulting decontaminated gas from said outlet;
    c. interrupting the passage of said oxygen-containing inert gas through said sorptive media by closing said inlet and outlet when the contaminants in said decontaminated gas reaches the desired concentration;
    d. desorbing said contaminants by the application of indirect heat to said sorptive media;
    e. oxidizing the desorbed contaminants in the presence of said oxidation catalyst and the oxygen in said oxygen-containing inert gas remaining in the voids of said reaction zone to innocuous reaction products;
    f. venting and purging the innocuous reaction products from said reaction zone; and
    g. cooling said reaction zone to ambient conditions.

2. The method of claim 1 wherein said media is an activated adsorbent selected from the group consisting of carbon, charcoal or mixtures thereof.

3. The method of claim 2 wherein said oxidizable organic contaminant is vinyl chloride monomer.

4. The method of claim 3 wherein said oxygen-containing inert gas is air.

5. The method of claim 1 wherein said catalyst is platinum, palladium or a salt thereof deposited on a support.

6. The method of claim 5 wherein said support is alumina.

7. The method of claim 5 wherein said support is activated carbon.

8. The method of claim 7 wherein the activated carbon support is also said sorptive media.

9. The method of claim 1 wherein said sorptive media is indirectly heated to a temperature of from about 90° to 200° C.

10. The method of claim 1 wherein said sorptive media is indirectly heated to a temperature of from about 120° to 180° C.

11. The method of claim 1 wherein said oxidizable organic contaminant is present in a concentration of up to about 5% based on the weight of said oxygen-containing inert gas.

12. The method of claim 11 wherein water vapor is also present in said oxygen-containing inert gas.

13. A continuous method of removing low concentrations of oxidizable organic contaminants from an oxygen-containing inert gas in a cyclic operation using at least two parallel reaction zones each having an inlet and an outlet which comprises:
    in a first reaction zone,
    a. adsorbing said oxidizable contaminants onto a sorptive media which is in intimate contact with an oxidation catalyst selected from the group consisting of platinum metal, palladium metal and the salts thereof or mixtures of same by passing said gas through said inlet and said sorptive media;
    b. removing the resulting decontaminated gas from said outlet; and
    simultaneously in a second reaction zone,
    c. interrupting the passage of said oxygen-containing inert gas through a sorptive media by closing said inlet and outlet when the contaminants in said decontaminated gas reaches the desired concentration;
    d. desorbing said contaminants by the application of indirect heat;
    e. oxidizing the desorbed contaminants in the presence of said oxidation catalyst and the oxygen in said oxygen-containing inert gas remaining in the voids of said reaction zone to innocuous reaction products;
    f. venting and purging the innocuous reaction products from said reaction zone;
    g. cooling said reaction zone to ambient conditions, and
    thereafter repeating steps (a) and (b) in said second reaction zone and the steps (c) through (g) in said first reaction zone.

* * * * *